United States Patent
Kim et al.

(10) Patent No.: US 10,741,862 B2
(45) Date of Patent: Aug. 11, 2020

(54) FUEL CELL COMPONENT AND MANUFACTURING DEVICE THEREOF

(71) Applicants: Hyundai Motor Company, Seoul (KR); Kia Motors Corporation, Seoul (KR)

(72) Inventors: Young Gun Kim, Seoul (KR); Sun Ho Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/379,589

(22) Filed: Apr. 9, 2019

(65) Prior Publication Data

US 2019/0267654 A1 Aug. 29, 2019

Related U.S. Application Data

(62) Division of application No. 15/256,863, filed on Sep. 6, 2016, now abandoned.

(30) Foreign Application Priority Data

Mar. 4, 2016 (KR) ........................ 10-2016-0026657

(51) Int. Cl.
*H01M 8/1004* (2016.01)
*H01M 8/0271* (2016.01)
*H01M 8/0273* (2016.01)
*H01M 8/1018* (2016.01)
*B32B 37/00* (2006.01)
*B32B 37/12* (2006.01)

(52) U.S. Cl.
CPC ....... *H01M 8/1004* (2013.01); *H01M 8/0271* (2013.01); *H01M 8/0273* (2013.01); *H01M 8/1018* (2013.01); *B32B 37/0046* (2013.01); *B32B 37/1284* (2013.01); *B32B 2457/18* (2013.01); *H01M 2008/1095* (2013.01); *Y02P 70/56* (2015.11)

(58) Field of Classification Search
CPC ............ H01M 8/1004; H01M 8/0273; H01M 8/1018; H01M 8/0271; H01M 2008/1095; B32B 2457/18; B32B 37/1284; B32B 37/0046; Y02P 70/56
See application file for complete search history.

(56) References Cited

U.S. PATENT DOCUMENTS

| | | | | |
|---|---|---|---|---|
| 5,680,696 A | * | 10/1997 | Bonura | H02K 15/00 198/346.2 |
| 2003/0217800 A1 | * | 11/2003 | Kim | F16D 69/04 156/64 |
| 2008/0145712 A1 | * | 6/2008 | Pierpont | B32B 37/203 429/509 |
| 2010/0000679 A1 | * | 1/2010 | Han, II | H01M 4/881 156/330 |
| 2013/0071768 A1 | * | 3/2013 | Song | H01M 8/1004 429/465 |

FOREIGN PATENT DOCUMENTS

| | | |
|---|---|---|
| JP | 2013-178980 A | 9/2013 |
| KR | 10-2003-0091342 A | 12/2003 |
| KR | 10-2009-0088719 A | 8/2009 |
| KR | 2010-0004495 A | 1/2010 |
| KR | 2012-0063574 A | 6/2012 |

* cited by examiner

*Primary Examiner* — Muhammad S Siddiquee
(74) *Attorney, Agent, or Firm* — Mintz Levin Cohn Ferris Glovsky and Popeo, P.C.; Peter F. Corless

(57) ABSTRACT

A device for manufacturing a fuel cell component is provided. The device includes a movement device configured to load a gas diffusion layer from a magazine when the gas diffusion layer is loaded to an inlet of a conveyor and unload the gas diffusion layer from an outlet side of the conveyor. An adhesive layer forming device that is disposed over the conveyor forms an adhesive layer in an edge region of the gas diffusion layer. A drying device is configured to dry the adhesive layer formed in the gas diffusion layer. An inspection vision is configured to detect an image of the gas diffusion layer that the adhesive layer is formed. Additionally, a controller operates the movement device, the adhesive layer forming device, and the drying device and configured to use the image to determine a shape of the adhesive layer formed in the gas diffusion layer.

5 Claims, 5 Drawing Sheets

FUEL CELL COMPONENT AND MANUFACTURING DEVICE THEREOF

CROSS-REFERENCE TO RELATED APPLICATION

This application is a Divisional of U.S. application Ser. No. 15/256,863 filed on Sep. 6, 2016, which claims priority to and the benefit of Korean Patent Application No. 10-2016-0026657 filed in the Korean Intellectual Property Office on Mar. 4, 2016, the entire contents of which are incorporated herein by reference.

BACKGROUND (a) Field of the Invention

The present invention relates to a fuel cell component and a manufacturing device, and more particularly, to coat an adhesive to a portion of a gas diffusion layer and to attach the coated adhesive to a membrane-electrode assembly (MEA) and a subgasket to reduce cost and maintain the position of the adhesive from moving toward an electrode to improve performance.

(b) Description of the Related Art

Typically, in a polymer electrolyte fuel cell, a membrane-electrode assembly (MEA) is a main component disposed in the innermost fuel cell. In particular, a 3-layer membrane-electrode assembly (MEA) includes a structure in which catalyst layers for a fuel electrode and an air electrode are disposed on both surfaces of the electrolyte membrane is. A 5-layer membrane-electrode assembly (MEA) includes a structure in which a gas diffusion layer (GDL) is stacked on the exterior portion of the catalyst layer.

The MEA includes a polymer electrolyte membrane, the catalyst layer (e.g., or an electrode) disposed on both sides of the polymer electrolyte membrane and a subgasket. The subgasket has a thickness greater than a thickness of the catalyst layer that facilitates the handling of the MEA and is bonded to both sides of an edge area of the polymer electrolyte membrane and is an inert polymer film such as polyethylene (PE)), polyethylene naphthalate (PEN) etc. A single unit cell is formed when a separator that has a flow field formed therein to supply fuel and to exhaust water generated by a reaction is stacked on the exterior of the gas diffusion layer. A fuel cell stack of desired size is formed when the unit cells are stacked.

A method for manufacturing the MEA includes a method for manufacturing the 5-layer membrane-electrode assembly using a catalyst coated on GDL (CCG). A method for manufacturing the 3-layer membrane-electrode assembly using a catalyst coated on membrane (CCM) method. The CCG method directly coats the catalyst layer on the gas diffusion layer to bond the coated catalyst layer to the polymer electrolyte membrane. The CCM method directly coats the catalyst layer on the polymer electrolyte membrane.

According to the CCG method or a catalyst coated on substrate (CCS) method that directly coats the catalyst layer on the gas diffusion layer. After the catalyst layer is directly coated on the gas diffusion layer bonding between the catalyst layer and the polymer electrolyte membrane is performed by a heat press process (e.g., or a thermocompression bonding process) to manufacture the 5-layer membrane-electrode assembly. According to the CCM method, after the gas diffusion layer is stacked on the catalyst layer, a separate process that presses the gas diffusion layer stacked to bond the gas diffusion layer stacked to the catalyst layer is required. In other words, when unit cells including the 3-layer membrane-electrode assemblies are stacked in a stack manufacturing process using automatic equipment after the 3-layer membrane-electrode assembly is manufactured using the CCM method, the process that bonds the gas diffusion layer to the catalyst layer is required.

The CCM method has limited productivity for mass production of the fuel cell stack. When the gas diffusion layer is temporarily bonded to the 3-layer MEA by the thermocompression bonding process, an interface where a fuel cell reaction occurs is formed between the catalyst layer and the gas diffusion layer and an interface is formed between the subgasket and the gas diffusion layer. However, the bonding force is weak between the catalyst layer and the gas diffusion layer or the subgasket and the gas diffusion layer. When the keeping (stand-by) duration for mass production of the fuel cell stack is increased the bonding force becomes further weakened. Accordingly, the catalyst layer may be separated from the gas diffusion layer. One approach to increase the bonding force is to coat an ionomer such as Nafion on the gas diffusion layer prior to the thermocompression thereof to the catalyst layer. However, since the interface of the gas diffusion layer that contacts the catalyst layer has a hydrophilic property, the bonding force is not significantly increased.

The above information disclosed in this section is merely for enhancement of understanding of the background of the invention and therefore it may contain information that does not form the prior art that is already known in this country to a person of ordinary skill in the art.

SUMMARY

The present invention provides a fuel cell component and a manufacturing device thereof s capable of reducing adhesive cost by coating an adhesive on an area between a subgasket and a gas diffusion layer. Accordingly, an adhesive is not required to be applied to the entire subgasket and airtightness is maintained and improves cell performance by preventing the adhesive from flowing into a reaction surface that corresponds to an electrode.

An exemplary embodiment of the present invention provides the fuel cell component that may include an electrolyte membrane a subgasket which covers sides of the electrolyte membrane and the electrodes and extends in a width direction or a longitudinal direction of the electrolyte membrane, a gas diffusion layer coupled to one surface of the subgasket and one surface of the electrode; and an adhesive layer disposed between the subgasket and the gas diffusion layer.

The electrode may include an anode electrode formed on a first surface of the electrolyte membrane and a cathode electrode formed on a second surface of the electrolyte membrane. The gas diffusion layer may include an upper gas diffusion layer coupled to the anode electrode and a lower gas diffusion layer coupled to the cathode electrode.

The adhesive layer may be formed in an edge region of the gas diffusion layer except for a portion that corresponds to the electrode. The adhesive layer may be formed in the edge region of the gas diffusion layer on the interior (e.g., not to be exposed to the outside) of the subgasket and the gas diffusion layer. The adhesive layer may be continuously formed along the edge region of the gas diffusion layer. The adhesive layer may be formed with space along the edge region of the gas diffusion layer. The electrolyte membrane may protrude a distance from the sides of the electrodes and the subgasket covers the side of the electrode and the side of the electrolyte membrane.

In an exemplary embodiment of the manufacturing device of the fuel cell component may include a movement device configured to load a gas diffusion layer from a magazine that loads the gas diffusion layer to an inlet of a conveyor and configured to unload the gas diffusion layer from an outlet side of the conveyor, an adhesive layer forming device disposed over the conveyor and configured to form an adhesive layer in an edge region of the gas diffusion layer, a drying device may be configured to dry the adhesive layer formed in the gas diffusion layer, an inspection vision configured to detect an image of the gas diffusion layer on which the adhesive layer is formed and a controller configured to adjust the movement device, the adhesive layer forming device and the drying device and may be configured to use the image to determine a shape of the adhesive layer formed in the gas diffusion layer.

The adhesive layer forming device may be configured to form the adhesive layer in an edge region of the gas diffusion layer. Additionally, the adhesive layer forming device may continuously form the adhesive layer along the edge region of the gas diffusion layer. The adhesive layer forming device may form the adhesive layer with space along the edge region of the gas diffusion layer.

The drying device may be configured to use heated air to apply heat to the gas diffusion layer and the adhesive layer. The movement device may be configured to separate a slip sheet attached to the gas diffusion layer and load the gas diffusion layer when the separator sheet is separated to an inlet of the conveyor. The drying device may be configured to apply heat to the gas diffusion layer and the adhesive layer using a hot plate (e.g., a heat plate) heated to a preset temperature. The adhesive layer forming device may include a spray nozzle configured to spray an adhesive to form the adhesive layer in an edge region of the gas diffusion layer and an imaging device may be configured to detect the adhesive sprayed from the spray nozzle and image data of the sprayed adhesive.

The exemplary embodiments may reduce adhesive cost by coating an adhesive only on a predetermined area between the subgasket and the gas diffusion layer without applying the adhesive to the reaction surface corresponding to the electrode in the gas diffusion layer. Additionally, an airtight condition may be maintained and cell performance may be improved by preventing the adhesive from flowing into the reaction surface.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
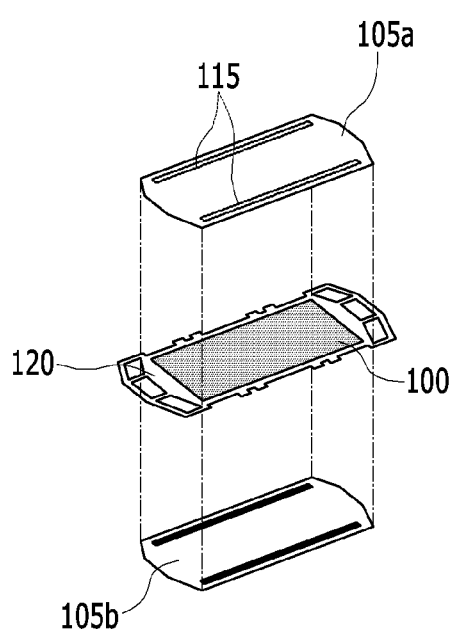
FIG. 1 is an exemplary exploded perspective view of a fuel cell component according to an exemplary embodiment of the present invention.

The present disclosure will be described more fully hereinafter with reference to the accompanying drawings, in which exemplary embodiments of the disclosure are shown. However, it is to be understood that the disclosure is not limited to the disclosed embodiments, but, on the contrary, is intended to cover various modifications. As those skilled in the art would realize, the described exemplary embodiments may be modified in various different ways, all without departing from the spirit or scope of the present disclosure. On the contrary, the invention is intended to cover not only the exemplary embodiments, but also various alternatives, modifications, equivalents and other embodiments, which may be included within the spirit and scope of the invention as defined by the appended claims.

The sizes and thicknesses of the configurations shown in the drawings are provided selectively for the convenience of description, such that the present invention is not limited to those shown in the drawings and the thicknesses are exaggerated to make some parts and regions clear. However, parts which are not related with the description are omitted for clearly describing the exemplary embodiment of the present invention, and like reference numerals refer to like or similar elements throughout the specification. In the following description, dividing names of components into first, second, and the like is to divide the names because the names of the components are the same as each other, and an order thereof is not particularly limited.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present invention clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

FIG. 1 is an exemplary exploded perspective view of a fuel cell component according to an exemplary embodiment of the present invention. Referring to FIG. 1, the fuel cell component may include a membrane-electrode assembly (MEA) 100, a subgasket 120, an upper gas diffusion layer 105a, a lower gas diffusion layer 105b, and an adhesive layer 115.

Figure 2:
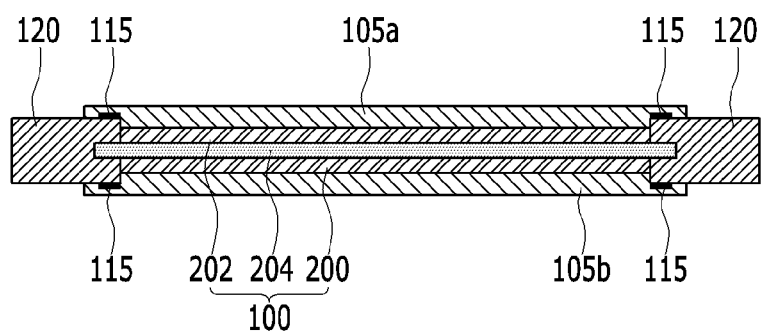
FIG. 2 is an exemplary cross-sectional view of the fuel cell component according to an exemplary embodiment of the present invention.

As shown in FIG. 2, the MEA 100 may include a polymer electrolyte membrane 204, an anode electrode 202 formed on a first surface of the electrolyte membrane 204, a cathode electrode 200 formed on a second surface of the electrolyte membrane. The subgasket 120 may cover side surfaces of the MEA 100 and may extend toward the exterior of the MEA. The upper gas diffusion layer 105a may be coupled to an upper surface of the MEA 100 and the lower gas diffusion layer 105a may be coupled to a lower surface of the MEA. An edge surface of the upper gas diffusion layer may be coupled to the subgasket 120 and an edge surface of the lower gas diffusion layer may be coupled to the subgasket. The adhesive layer 115 may be formed in the edge surfaces of the upper gas diffusion layer 105a and the lower gas diffusion layer 105b. The edge surfaces may be disposed adjacent to the subgasket 120. In the exemplary embodiment of the present invention, the upper gas diffusion layer and the lower gas diffusion layer may be referred to as a gas diffusion layer 105, as shown in FIG. 3 and FIG. 4.

FIG. 2 is an exemplary cross-sectional view of the fuel cell component according to an exemplary embodiment of the present invention. Referring to FIG. 2, the fuel cell component may include the electrolyte membrane 204, the anode electrode 202, the cathode electrode 200, the subgasket 120, and the adhesive layer 115. The anode electrode 202 may be formed in a first surface of the electrolyte membrane 204 and the cathode electrode 200 may be formed in a second surface of the electrolyte membrane. An edge portion of the electrolyte membrane 204 may protrude (e.g., extend) a predetermined distance from side surfaces of the anode electrode 202 and the cathode electrode 200. The subgasket 120 may cover sides of the anode electrode 202, the cathode electrode 200, and the electrolyte membrane 204 and may extend in an outward direction of the sides. A thickness The subgasket 120 may have a thickness that is greater than a total thickness of the anode electrode 202, the electrolyte membrane 204, and the cathode electrode 200.

In the exemplary embodiment of the present invention, the upper gas diffusion layer 105a may be coupled to the anode electrode 202 and the lower gas diffusion layer 105b may be coupled to the cathode electrode 200. Edge surfaces of the upper gas diffusion layer 105a and the lower gas diffusion layer 105b may be coupled to an exterior surface of the subgasket 120. The adhesive layer 115 may be formed between the edge surface of the upper gas diffusion layer 105a and the exterior surface of the subgasket 120 and between the edge surface of the lower gas diffusion layer 105b and the exterior surface of the subgasket 120. In the exemplary embodiment of the present invention, the adhesive layer 115 may not be formed in the entire subgasket and may be formed only on contact surfaces disposed between the upper gas diffusion layer 105a and the subgasket 120 and between the lower gas diffusion layer 105b and the subgasket 120. Accordingly, an adhesive of the adhesive layer 115 may be prevented from flowing into the anode electrode 202 and the cathode electrode 200 and performance of a fuel cell stack may be maintained more stably.

Figure 3:
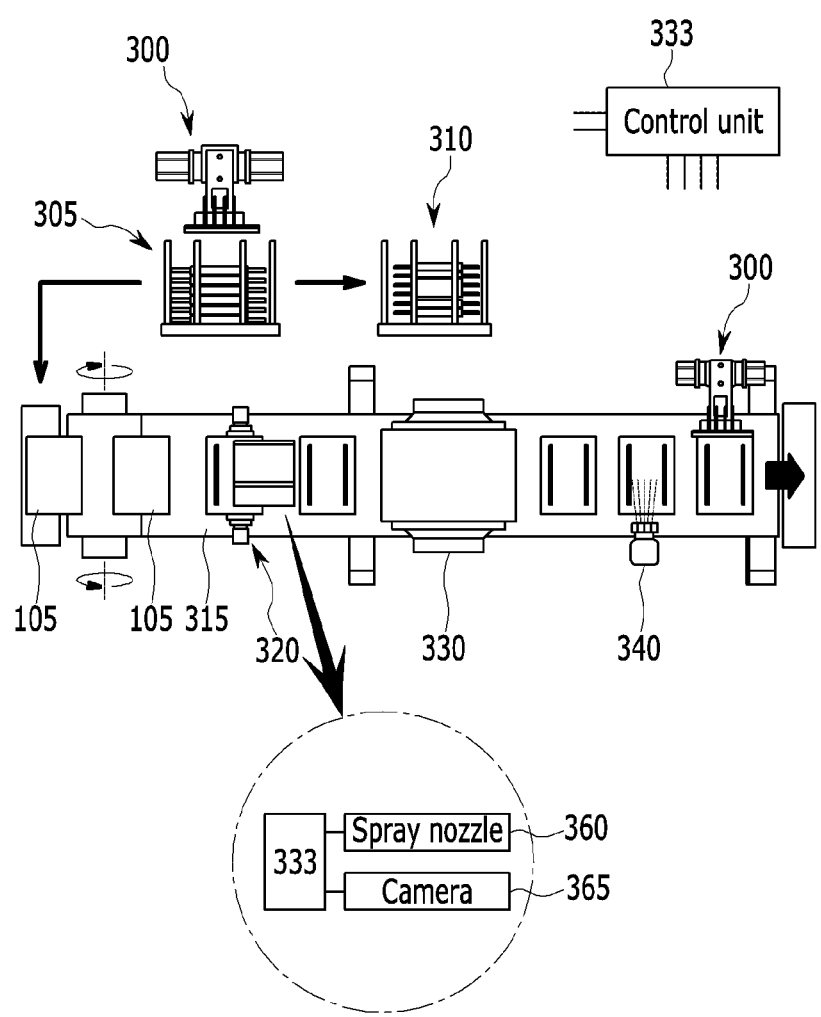
FIG. 3 is an exemplary view describing a manufacturing device of the fuel cell component according to an exemplary embodiment of the present invention.
Figure 4:
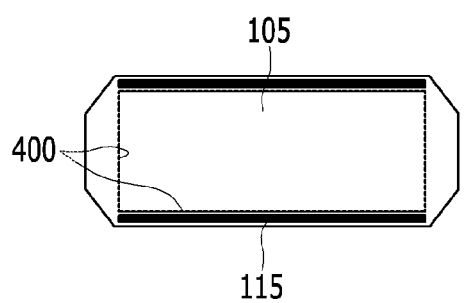
FIG. 4 is an exemplary top plan view of the fuel cell component according to an exemplary embodiment of the present invention.
Figure 4:
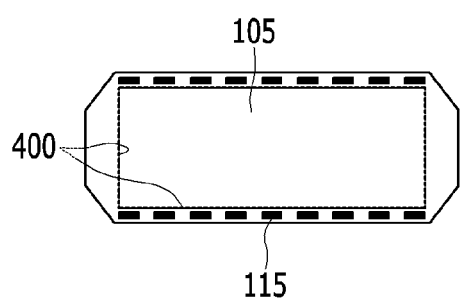

FIG. 3 is an exemplary view describing a manufacturing device of the fuel cell component according to an exemplary embodiment of the present invention. Referring to FIG. 3, the manufacturing device of the fuel cell component may include a movement device 300, a gas diffusion layer magazine 305, a slip sheet magazine 310, a conveyor 315, an adhesive layer forming device 320, and a drying device 330, an inspection vision (e.g., or an vision inspection device) 340, and a controller 333. In particular, the movement device 300 may be configured to discharge a slip sheet from the gas diffusion layer magazine 305 to the slip sheet magazine 310 and adsorb the gas diffusion layer 105 to load the adsorbed gas diffusion layer to an inlet of the conveyor 315.

The gas diffusion layer 105 loaded on the conveyor 315 may be transferred to the adhesive layer forming device 320. The adhesive layer forming device may be configured to coat the adhesive to a predetermined region of the gas diffusion layer to form the adhesive layer 115. The adhesive layer forming device 320 may include a spray nozzle 360 configured to spray the adhesive to form the adhesive layer and an imaging device 365 (e.g., a camera, video camera or the like) that detects (e.g., senses) the sprayed adhesive as image data. The controller 333 may use the image data to adjust an amount of the adhesive sprayed from the spray nozzle and a moving speed of the spray nozzle.

The drying device 330 may be configured to use hot air at about 100° C. to dry the gas diffusion layer 105 and the adhesion layer 115. Alternatively, a hot plate may be used to dry the gas diffusion layer and the adhesion layer. The inspection vision 340 imaging device may detect (e.g., sense) a shape of the adhesive layer 115 formed in the gas diffusion layer 105 to transmit the detected shape data to the controller 333. The controller 333 may be configured to detect the shape of the adhesive layer 115 transmitted from the inspection vision 340 to calculate a thickness, a width, and a position of the shape, to determine whether the shape is normal. The controller 333 may be configured to adjust the movement device 300 to load the gas diffusion layer 105 to the conveyor 315 or load or to unload the gas diffusion layer 105 from the conveyor 315 and may be configured to adjust the adhesive layer forming device 320 and the drying device 330. The controller 333 may include one or more microprocessors configured to be operated by a predetermined program. The program may include a set of instructions for performing the method according to the exemplary embodiment of the present invention.

FIG. 4 is an exemplary top plan view of the fuel cell component according to an exemplary embodiment of the present invention. Referring to FIG. 4, the adhesive layer 115 may be formed in an edge surface of the gas diffusion layer 105 and may be formed along a longitudinal direction (e.g., or a length direction) of the gas diffusion layer. The edge surface may be disposed at a position in a width direction of the gas diffusion layer 105. In the exemplary embodiment of the present invention, the adhesive layer 115 may be formed in an exterior side of a reaction boundary 400 that corresponds to the anode electrode 202 and the cathode electrode 200 and may be continuously formed in a preset area disposed between an exterior side of the gas diffusion layer 105 and the reaction boundary. The adhesive layer 115 may be discontinuously formed with space (e.g., or with preset intervals) in the area between the exterior side of the gas diffusion layer 105 and the reaction boundary 400.

Figure 5:
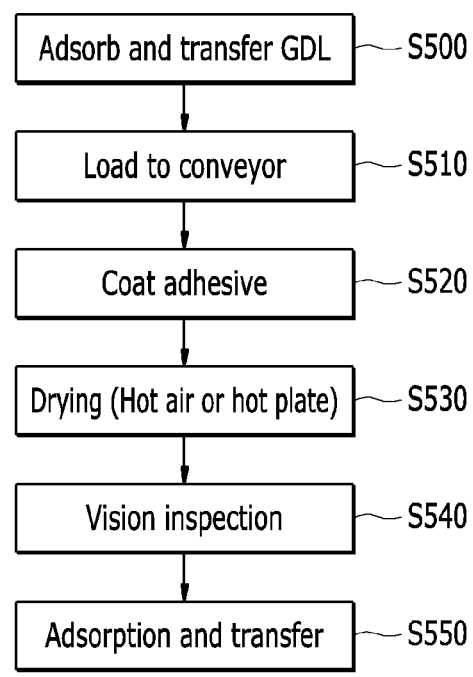
FIG. 5 is an exemplary flowchart illustrating a manufacturing method of the fuel cell component according to an exemplary embodiment of the present invention.

FIG. 5 is an exemplary flowchart illustrating a manufacturing method of the fuel cell component according to an exemplary embodiment of the present invention. Referring to FIG. 5, in step S500, the controller 333 may be configured to adjust the movement device 300 to adsorb and transfer the gas diffusion layer (GDL) 105. For example, the slip sheet attached to the gas diffusion layer 105 may be discharged to a predetermined position.

In step S510, the movement device 300 may be configured to load the adsorbed gas diffusion layer 105 to the inlet of the conveyor 315. In step S520, the adhesive layer forming device 320 may be configured to form the adhesive layer 115 in a predetermined area of the gas diffusion layer 105. In step S530, the drying device 330 may be configured to dry the adhesive layer 115 by using the hot air.

Further, in S540, the inspection vision 340 may be configured to sense the shape (e.g., or the form) of the adhesive layer 115 formed in the gas diffusion layer 105 to transmit the detected shape to the controller 333 and the controller 333 may be configured to determine when the shape is normal. In S550, the movement device 300 may be configured to adsorb the gas diffusion layer 105 discharged from an outlet of the conveyor 315 to unload from the outlet of the conveyor and may load the unloaded gas diffusion layer in a predetermined place.

In the exemplary embodiment of the present invention, the width of the adhesive layer may be about 2 mm, the width of the adhesive layer dried may be about 3 mm, and temperature of the hot air may be about 100° C. The controller may be configured to separate the gas diffusion layer into a normal gas diffusion layer and an abnormal gas diffusion layer based on the shape sensed by the inspection vision when the adhesive layer is dried. The separated layers may be loaded in a predetermined place. To improve quality of the adhesive layer, an ambient temperature of the adhesive layer may be about 22±1° C. and an ambient humidity of the adhesive layer may be about 70±10%. The inspection vision may be configured to sense a thickness, a width, and a location of the adhesive layer by using a laser beam. The adhesive layer forming device may be configured to monitor a supply and a discharge amount of the adhesive in real time.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

100: MEA
105a: upper gas diffusion layer
105b: lower diffusion layer
115: adhesive layer
120: subgasket
200: cathode electrode
202: anode electrode
204: electrolyte membrane
300: movement device
305: gas diffusion layer magazine
310: slip sheet magazine
315: conveyor
320: adhesive layer forming device
330: drying device
333: controller
340: inspection vision
400: reaction boundary

What is claimed is:

1. A device for manufacturing a fuel cell component, comprising:
    a movement device configured to load a gas diffusion layer from a magazine in which the gas diffusion layer is loaded to an inlet of a conveyor and configured to unload the gas diffusion layer from an outlet side of the conveyor;
    an adhesive layer forming device disposed over the conveyor and configured to form an adhesive layer in an edge region of the gas diffusion layer;
    a drying device configured to dry the adhesive layer formed in the gas diffusion layer;
    an inspection vision configured to detect an image of the gas diffusion layer on which the adhesive layer is formed; and
    a controller configured to operate the movement device, the adhesive layer forming device, and the drying device and configured to use the image to determine a shape of the adhesive layer formed in the gas diffusion layer,
    wherein the movement device is configured to separate a slip sheet attached to the gas diffusion layer and load the gas diffusion layer from which the slip sheet is separated to an inlet of the conveyor, and
    wherein the adhesive layer forming device includes:
        a spray nozzle configured to spray an adhesive to form the adhesive layer in the edge region of the gas diffusion layer; and
        an imaging device configured to detect the adhesive sprayed from the spray nozzle and image data of the sprayed adhesive.

2. The device of claim 1, wherein the adhesive layer forming device is configured to continuously form the adhesive layer along an edge region of the gas diffusion layer.

3. The device of claim 1, wherein the adhesive layer forming device is configured to form the adhesive layer with space along an edge region of the gas diffusion layer.

4. The device of claim 1, wherein the drying device is configured to apply heated air to the gas diffusion layer and the adhesive layer.

5. The device of claim 1, wherein the drying device configured to use a hot plate to apply heat to the gas diffusion layer and the adhesive layer.

* * * * *